(No Model.)
H. BROOM, A. WHITELEY & J. G. HINCKLEY.
TRACTION WHEEL.
No. 514,061. Patented Feb. 6, 1894.
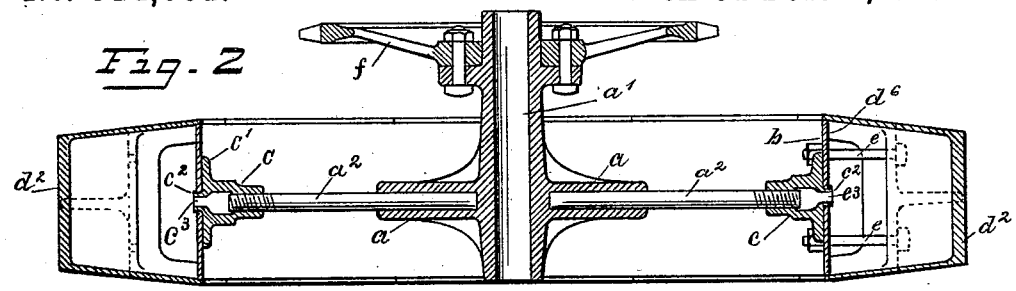
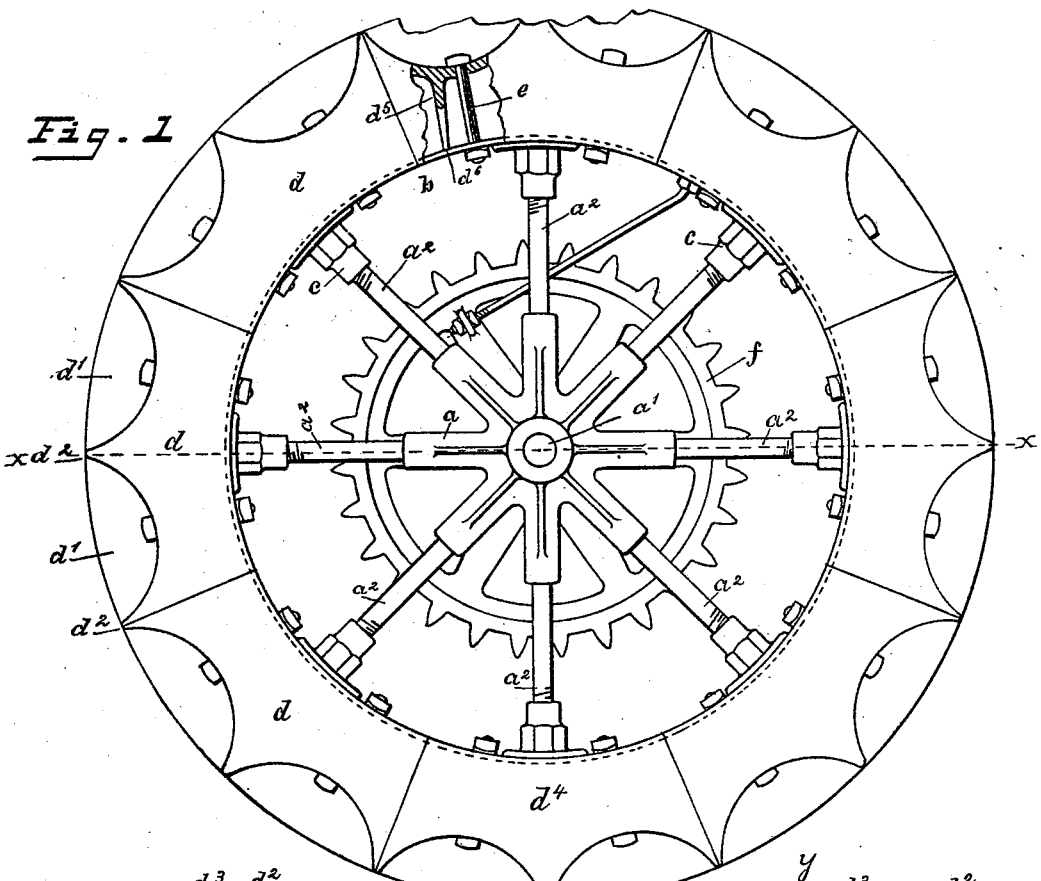
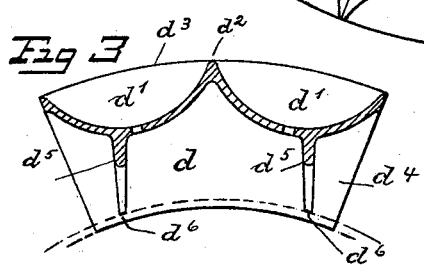
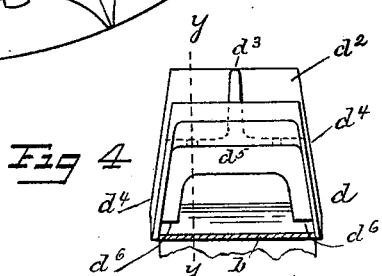
Witnesses
Robt Weiskotten
H. P. Baker
Inventors
Henry Broom
Amos Whiteley
and James G. Hinckley
By Staley and Shepherd Attys
THE NATIONAL LITHOGRAPHING COMPANY,
WASHINGTON, D. C.

UNITED STATES PATENT OFFICE.

HENRY BROOM, AMOS WHITELEY, AND JARED G. HINCKLEY, OF SPRINGFIELD, OHIO, ASSIGNORS TO AMOS WHITELEY, OF SAME PLACE.

TRACTION-WHEEL.

SPECIFICATION forming part of Letters Patent No. 514,061, dated February 6, 1894.

Application filed May 20, 1892. Serial No. 433,776. (No model.)

*To all whom it may concern:*

Be it known that we, HENRY BROOM, AMOS WHITELEY, and JARED G. HINCKLEY, citizens of the United States, residing at Springfield, in the county of Clark and State of Ohio, have invented certain new and useful Improvements in Traction-Wheels, of which the following is a specification.

Our invention relates to improvements in wheels for harvesters, our improved wheel being especially designed for use as the master or driving wheel for harvesters, adapted to be used in soft or muddy soil, such, for instance as rice harvesters.

The object of our invention is to provide a wheel preferably in the nature of a sectional wheel with suitable peripheral projections to prevent slipping in soft or marshy soil, the construction being such that when traversing hard and level surfaces, the jolting or jarring occasioned by the ground contact of the successive peripheral projections is prevented.

A further object of our invention is to provide a wheel rim the peripheral surfaces of which are such that as the wheel becomes embedded in soft or marshy soil, a large surface is presented to support said wheel, the construction being such as to present a surface which may easily be withdrawn from the soft or marshy soil into which the wheel rim becomes embedded as it revolves, and further to prevent the soil from accumulating within the central portion of the wheel.

Our invention consists in the various constructions and combinations of parts hereinafter described and pointed out in the claim.

In the accompanying drawings Figure 1 is a side elevation of a wheel embodying our invention. Fig. 2 is a sectional elevation of the same on line X X in Fig. 1. Figs. 3 and 4 are detail views of the rim sections, Fig. 3 being a sectional elevation on line Y Y in Fig. 4.

Like parts are represented by similar letters of reference in the several views.

In the said drawings $a$, represents a central core or spider provided with a hub $a'$, formed with a central bearing to receive the main axle or supporting spindle. This spider is preferably formed of cast metal and has cast therein a series of wrought iron spokes $a^2$, extending radially therefrom. A wrought iron tire or rim $b$, is secured to the respective spokes $a^2$, in the following manner: Each of the projecting spokes $a^2$, is screw-threaded at its outer end and adapted to receive a screw-cap or nut $c$, having laterally projecting flanges $c'$ adapted to bear against the inner periphery of the inner rim $b$, and, with a central projecting boss or trunnion $c^2$, adapted to project through an opening formed in said rim. The screw-cap $c$, is formed hollow being preferably cast of metal and cored out, so that an opening is formed entirely through the same and through the projecting boss or stud $c^2$, as shown at $c^3$. The spider with the spokes and screw-caps is placed within the inner rim $b$, and the cap screwed outwardly on said spokes until the projecting studs or bosses $c^2$, enter the openings in the periphery of the wheel and the projecting flanges $c'$, rest against the inner periphery of the wheel, the spider being centered in said rim by the adjustment of said caps, in a well known manner, after which the outer projecting ends of the studs or bosses $c^2$, are riveted or swaged slightly downward on the outer periphery of the wheel, thus binding all the parts firmly together; the screw-caps being preferably formed of malleable iron for this purpose.

The inner rim or tire $b$, is preferably made of a width corresponding substantially to the greatest width desired for the wheel periphery, and onto this rim is formed an outer rim or periphery, containing a series of peripheral pockets or depressions and intervening peripheral projections between the same. This outer rim is formed in sections $d$, each of which is provided with peripheral pockets $d'$, and intermediate peripheral projections or divisions $d^2$. Each section is preferably adapted to contain two of said depressions or pockets, the projections or divisions at the ends of said sections being formed of half the thickness of the intermediate divisions or projections and the ends of said sections being formed on radial lines, so that when a number of said sections are placed around the periphery of the inner rim $b$, they will completely surround the same, the end of one section being joined snugly to the end of the next succeeding section, thus forming a series of depressions or pockets alternating with a series of bosses or projections $d^2$. Each of said rim sections is preferably provided with a central longitudinal flange $d^3$, which divides said pockets or depressions centrally in the length thereof, said flange $d^3$, being preferably formed on the arc of a circle corresponding to the outer circumference of the completed wheel, the outer periphery of said flange standing flush with the dividing projections or ribs $d^2$, between the respective pockets or depressions. Each of said rim sections is provided with inwardly projecting side walls $d^4$, connected at suitable intervals by supporting ribs or bridges $d^5$, which extend transversely across the rim section on the under side of the pockets or depressions $d'$. The said walls $d^4$, project inwardly some distance beyond the bottoms of the pockets or depressions $d'$, and are preferably formed on an angle, so that the outer rim is tapered slightly at the sides from the inner rim outwardly, as shown in Figs. 3 and 4. A broad smooth surface is also thus formed at each side of the outer rim.

The transverse ribs or bridges $d^5$, are preferably formed of a U-shape, as shown in Fig. 4, with the lower extremities forming bearing surfaces or shoulders $d^6$, at a distance from the inner periphery of the side walls equal to the thickness of the wheel rim; the said sections being of a width at this point adapted to fit snugly over said rim, as shown in Fig. 4. Connecting bolts $e$, which pass through suitable openings, preferably in the bottoms of the depressions or pockets $d'$, through the inner rim $b$, secure the parts firmly together.

It will be understood that the wheel sections $d$, with the divisions, walls, flanges and bridges are formed integral, the construction being such that when the sections are in place, a hollow rim is formed, the thickness of the metal being as light as consistent with the required strength.

As illustrated in the drawings a sprocket-wheel $f$, is shown attached to the hub $a'$, of the wheel at one side. This is the preferable means of communicating the motion of the movable parts to the harvester or other machine with which it is employed, though it is obvious that this construction may be modified.

It will be understood that the wheel as thus described is simple, strong, light and effective for the purpose intended. The peripheral depressions or pockets, together with the dividing ribs or projections and the beveled side walls or faces, form a surface, especially adapted for loose or moist soil, the pockets or depressions being divided in the middle with the central peripheral flange which stands flush with the dividing projections or ribs, the said pockets or depressions are left open at each end, which will prevent the accumulation of mud or soil therein, while at the same time the said central rib or flange will present a smooth and even surface on which the wheel is adapted to roll when traversing hard and level surfaces. By the construction and arrangement of the parts described, composing the outer hollow peripheral rim, the liability of the parts becoming clogged with mud or loose soil is reduced to the minimum, while the tapered side faces of said rim permit it to be readily withdrawn from the soil of the character in which it is adapted to operate.

We make no claim to the inner construction of the wheel or the device used for connecting the spokes to the inner rim, as this is the invention of William N. Whiteley, of this city.

We claim—

A traction wheel constructed of an outer rim having a central ring on its periphery, and concave depressions on its peripheral surface arranged on each side of said central ring, and walled sides to said rim which extend at an angle from its periphery inwardly so as to form tapered walls on opposite sides of said rim, substantially as shown and for the purpose described.

In testimony whereof we have hereunto set our hands this 10th day of May, A. D. 1892.

HENRY BROOM.
AMOS WHITELEY.
JARED G. HINCKLEY.

Witnesses:
ELMER J. WHITELEY,
JOHN L. GILLIGAN.